United States Patent [19]

Köck et al.

[11] 3,877,326
[45] Apr. 15, 1975

[54] TENSIONING APPARATUS

[75] Inventors: Gerhard Köck, Erkelenz; Günter Wallrafen, Erkelenz-Kuckhoven; Erhard Hoffmann, Huckelhoven; Hubert Buschfeld, Erkelenz, all of Germany

[73] Assignee: Maschinen- und Bohregerate-Fabrik Alfred Wirth & Co., K.G., Erkelemz, Rhineland, Germany

[22] Filed: Dec. 3, 1973

[21] Appl. No.: 420,899

[30] Foreign Application Priority Data
Dec. 1, 1972 Germany.......................... 2258859

[52] U.S. Cl. ............................................ 81/57.38
[51] Int. Cl. ........................................ B25b 29/02
[58] Field of Search.................... 81/57.38; 254/29.5

[56] References Cited
UNITED STATES PATENTS
2,866,370  12/1958  Biach................................ 81/57.38
3,128,990  4/1964  Brooks et al...................... 81/57.38
3,287,999  11/1966  Kreckel et al. .................. 81/57.38

Primary Examiner—James L. Jones, Jr.
Attorney, Agent, or Firm—Holman & Stern

[57] ABSTRACT

This invention relates to an apparatus for tensioning fastening members, such as screw bolts provided with fixing nuts, and include a supporting frame for tensioning assemblies which can be set down on the screw bolts and each assembly has at least one cylinder with a piston sliding within the latter, which piston acts on a force transmitting element, such as a nut, which can be screwed down onto a screw bolt to be tensioned and means are provided on the supporting frame which serve to turn the fixing nuts on the screw bolts and the apparatus also comprises motor driven parts for rotating the force transmitting elements.

27 Claims, 4 Drawing Figures

TENSIONING APPARATUS

FIELD OF THE INVENTION

This invention relates to an apparatus for simultaneously tensioning one or more screw bolts, necked-down bolts, tie bars or like elements, which screw bolts or other elements are equipped with a fixing nut the apparatus being provided with a supporting frame for tensioning assemblies, which can be set down on the screw bolts, each of which tensioning assemblies has at least one cylinder, within which a piston is slidable, which piston acts on a force-transmitting element which can be screwed down on to the screw bolt which is to be tensioned, the force-transmitting element being in particular in the form of a nut, and the apparatus also being provided with means located on the supporting frame and serving to rotate the fixing nuts on the screw bolts.

BACKGROUND OF THE INVENTION

Apparatuses of this kind may for example be used in closure means for nuclear reactor vessels and for pressure containers, and also for other forms of connection which are subject to relatively great stresses or loads. Known forms of construction of apparatuses of this kind leave, however, something to be desired with respect to their construction and manipulation. In particular, numerous working steps have to be carried out by hand, which is time-consuming and required skilled personnel; under circumstances they may also entail danger.

SUMMARY OF THE INVENTION

The invention aims at improving an apparatus of the above-defined type, and at giving it a form of construction which is more satisfactory for practical purposes. In particular, the invention aims at giving the apparatus a form of construction such that at least part of the working steps, which are necessary for utilising the apparatus, no longer have to be carried out by hand or directly on the apparatus itself. Further, the invention has the aim of indicating how at least certain functions of the apparatus can be carried out in semi-automatic manner, or even in fully automatic manner, or of giving the apparatus a form of construction such that it will be ready for at least partially automatic operation.

The invention has the object of providing the apparatus with motor driven parts for rotating the pressure- or force-transmitting elements which, in the course of a tensioning operation, transmit force to the screw bolts. In this way it becomes possible to screw or unscrew the force-transmitting elements, for example nuts, on to and from the screw bolts without the use of manual labour, the apparatus being at the same time distinguished by its simplicity of construction and great reliability of operation. This is an important measure or expedient for avoiding work carried out by hand during use of the apparatus, or for achieving a semiautomatic or fully automatic form of operation.

In a favourable form of construction of the apparatus a rotatable actuating member is provided for each pressure- or force-transmitting element, which can be screwed into position on the screw bolt and serves to transmit force to the screw bolt during tensioning, this actuating member engaging by way of teeth, with which it is provided, in complementary teeth of the force-transmitting element, the actuating member being adapted to be driven by means of a motor, which is assigned to it, is disposed on the supporting frame, and is reversible with respect to its direction of rotation.

According to a further feature of the invention a motor is provided for each fixing nut, this motor being arranged on the supporting frame, being reversible in its direction of rotation, and serving as a rotaty drive for tightening and untightening the fixing nut. Conveniently, each fixing nut is assigned an actuating pinion wheel, which has a screwthread which engages in a complementary, outer screwhead belonging to the fixing nut. It is, in particular, envisaged that the actuating pinion wheel will be positioned on a shaft, which is mounted for rotation in the supporting frame.

In principle, a slip coupling (slipping clutch) may be provided between the drive and each actuating pinion wheel, or some other element provided for rotating the associated fixing nut, this slip coupling being located at some suitable point in the chain of force-transmitting elements and serving to limit the torque transmitted. The same applies to the rotary drives for the pressure- or force-transmitting elements referred to above.

The same applies to a supporting apparatus, also provided for by this invention, and by means of which the supporting frame can be raised and lowered relative to a supporting surface.

It will be found to be particularly satisfactory to use, for rotating the fixing nuts and/or the force-transmitting elements, motors which are driven by fluid pressure medium; thus, in addition to pneumatic motors, hydraulic motors can be used, in particular hydraulic motors equipped with rotating displacement elements, which resemble gear-wheels. Motors which rotate at a slow rate and which apply a relatively large torque can be used, such motors having small dimensions. However, it is also possible to use electric motors, in particular geared motors, for rotating the nuts.

Some hydraulically operated apparatuses - which serve to tension at least one screw bolt, necked-down bolt, tie bar or the like, which screw bolt or the like is equipped with a fixing nut, the said hydraulically actuated apparatuses having a tensioning assembly, which can be set down on the screw bolt - are so constructed that an extension or appendage can be screwthreadedly attached to the screw bolt, the piston which is slidable in the cylinder of the tensioning assembly then acting on this extension piece or appendage. Through the provision of this kind of part, which can be removed, it is possible to realise a container, or other object which is provided with fixing means in the form of screw bolts, which takes up less spaced in the heightwise dimensions. However, the necessity of screwing the extension pieces or appendages to the screw bolts may present difficulties. The invention has the object of providing a more satisfactory form of construction from this point of view. To this end the invention provides a conical screwthread by means of which the extension piece or appendage can be screwed on to the screw bolt proper. In this context it is, in particular, recommendable to employ a screwthread of a kind such as is used in another field of technology, that is to say in the field of deep drilling. There is thus realised the appreciable advantage that the two parts can be assembled together in a simple way, and that the extension piece or appendage will be self-centred while it is being introduced into the appropriate end of the screw bolt and while it is being screwed into the latter. In addition, this form of construction enables the number of revolutions, necessary for screwing these parts together, to be reduced, and thus a reduction in the amount of time required. This feature is therefore of particular advantage in the case of apparatuses of the type, defined above, in which it is desired to carry out screwing operations subject to suitable motor drives - and thereby eliminate work which would otherwise be done by hand - or to carry out individual working steps at least semi-automatically. To this extent a form of construction of this kind falls within the statement of objects to be achieved, which was defined at the outset of this specification. However, this feature also has an importance, which is independent of this.

The invention includes a further feature for effecting screwheaded joins or connections in nuclear reaction vessels and in pressure containers, and other joins or connections which are subject to high loads, and for fixing covers and the like in position, particularly with the assistance of the hydraulically actuated apparatus of the kind described in this specification, or of a similar kind. This further feature consists in giving the screw bolt - in front of or before the cylindrical screwthread, by means of which a fixing nut can be screwed into position - a portion equipped with a conical screwthread, which merges into the said cylindrical screwthread. According to a yet further feature of the invention the screw bolts, or extension pieces which are screw-connected to these screw bolts, have - in front of a cylindrical screwthread, which is used for tightening a nut, serving as a pressure- or force-transmitting element - a portion provided with a conical screwthread, which merges into the said cylindrical screwthread.

In this way it may be ensured that the fixing nut, or the nut which constitutes a force-transmitting element, receives - when this nut is being set down on the cooperating screw bolt - correct guidance, and also that satisfactory meshing between the cooperating screwthreaded portions is achieved from the outset.

Embodiments of the invention are further explained below, with reference to the accompanying drawing, together with details, features and advantages of the invention which have not been explained above.

DESCRIPTION OF PREFERRED EMBODIMENTS

Figure 2:
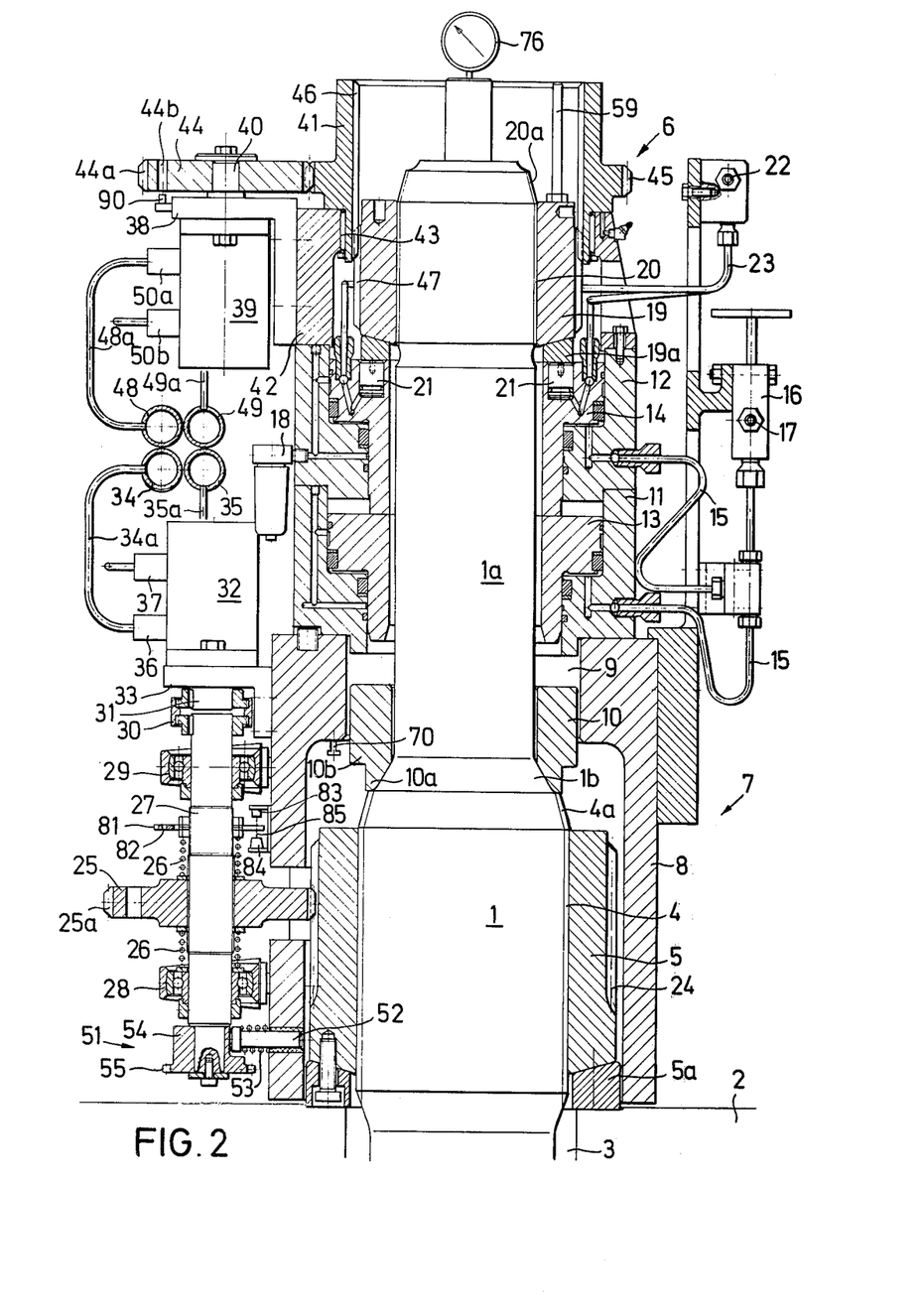
FIG. 2 is a cross-sectional view taken substantially along the line line II—II of FIG. 1.
Figure 3:
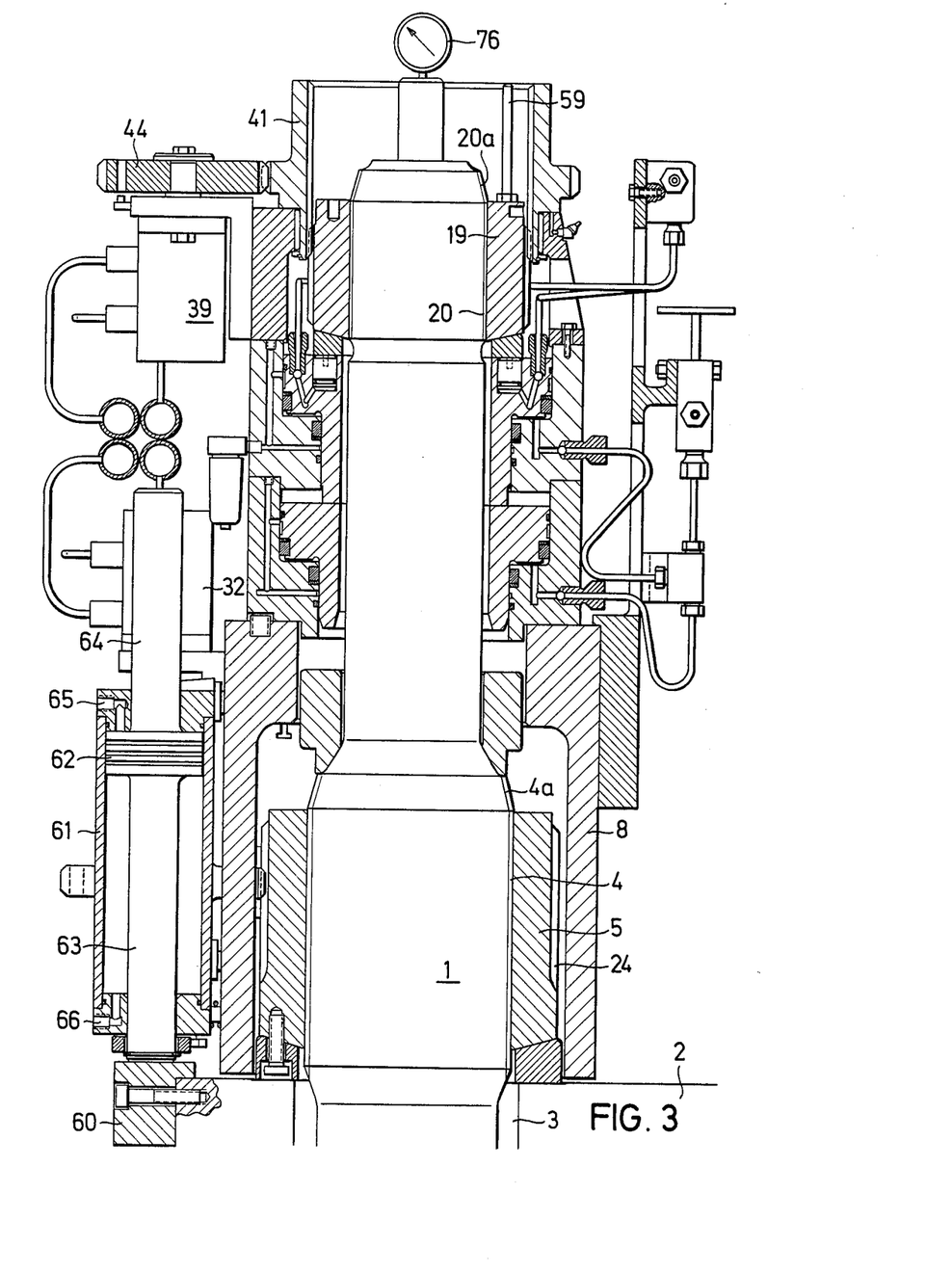
FIG. 3 is a cross-sectional view substantially taken along the line III—III of FIG. 1.
Figure 4:
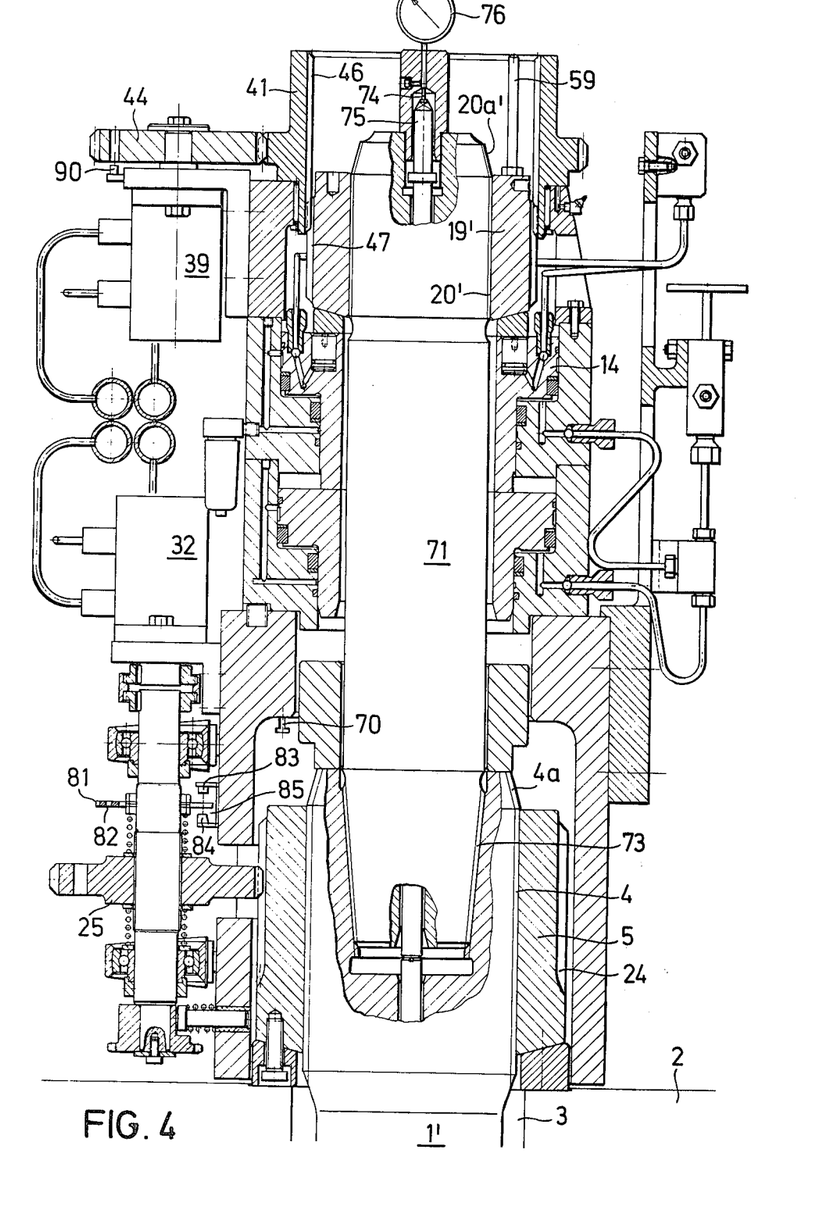
FIG. 4 is a cross-sectional view, substantially corresponding to the view of FIG. 2, but of a modification of the apparatus.

The apparatus illustrated serves to tension the screw bolts 1 of the closure cover of a pressure vessel, which is not shown. FIGS. 2 to 4 only show the cover flange 2, through whose bores 3 pass the screw bolts 1, formed on the pressure vessel. When the required closure seal has been formed the fixing nuts 5, which have been scresed down on the srewthread 4 of the screw bolts 1, are tensioned, by way of intermediate elements 5a, against the upper face of the closure cover flange 2, so that they press the latter against a flange or a butting suface of the pressure vessel.

The tensioning assembles, which serve to tension the screw bolts 1 and are generally designated by the reference numeral 6, are mounted on a supporting frame 7, which comprises a lower annular supporting part 8 and is connected to a central suspension member or the like, for example in a known manner and by means of braces or struts, which have a star-shaped configuration and incorporate a central suspension element or the like. A crane hook can engage this central suspension piece or the like, so that the apparatus as a whole can be set down on the cover flange concerned for the purpose of tensioning the screw bolts, and can be removed from the cover flange after the tensioning operation has been concluded. The supporting element 8 is constructed so that it can accommodate, in its interior (for example in separate chambers), the fixing nuts 5.

Further, the openings 9, provided in the supporting part 8 and serving to allow through passage to the screw bolts 1, are of sufficient size to enable a stepped ring 10 to be moved in then, this stepped ring 10 being freely axially shiftable on a stem portion 1a of the screw bolt 1, and to be supported, when located in the rest position illustrated, from a transitional portion 1b of the screw bolt 1. The portion 10a of the ring 10 lying closer to the fixing nut 5 has a slightly smaller diameter than the screwthread of the fixing nut 5, while an adjacent portion 10b, which defines a shoulder or step, has a diameter which is greater than that of the screwthread and smaller than the outer diameter of the nut 5. The purpose of this ring 10 will be explained below in the course of the description of the manner of operation of the apparatus.

Each tensioning assembly 6 has, in the case of the form of embodiment illustrated, two cylinders 11, 12, one of which lies above the other and which are connected to one another and also to the supporting part 8, for example by means of screws. Stepped (differential) pistons 13, 14 are slidable in cylinders 11, 12. The lower face of the upper piston 14 rests on the upper face of the lower piston 13. Fluid pressure medium is simultaneously fed to the two cylinders 11, 12 by way of parallel-connected ducts 15, which are connected to a supply conduit 17, serving for all the tensioning assemblies, by way of a blocking valve 16; in this way the two pistons 13, 14 can be given common and simultaneous movements. The use of two pistons, one of which lies above the other, affords the advantage, as against the use of a single piston, that the effective surface, against which the fluid pressure medium acts, is twice the size so that, for a given feed pressure, a doubly great force can be applied without greater widthwise dimensions being necessary to this end. The valves 16 are so constructed that, when necessary, each tensioning assembly can be individually cut off from the common supply conduit for the fluid pressure medium, although this supply conduit is not interrupted. Reference numeral 18 designates a device for collecting and removing leakage oil.

The upper face of the upper piston 14 acts on a ring 19a, which is conical at one of its ends and is associated with a nut 19 which can be screwed on to a screwthread 20, present at the upper end of the screw bolt 1. Nut 19 constitutes an abutment element for the piston 14, and transmits force, applied by this piston 14, for the purpose of tensioning the screw bolt 1. Each of the upper pistons 14 has two diametrically opposite-lying cylinder chambers or spaces, in which small pressure pistons 21 are slidable. These pistons 21 serve to return pistons 13 and 14 into their starting position when a tensioning operation has ended. When the presser pistons 21 are acted on by fluid pressure medium, applied by means of a common supply conduit 22 acting through the intermediary of branch ducts 23, the pistons are urged in an outward direction, so that they apply pressure to the underface of the ring 19a. At the same time pistons 13, 14 move into the cylinders 11, 12 (downwardly in FIGS. 2 to 4), until they have assumed their starting position, illustrated in the drawing.

Each fixing nut 5 is equipped with external teeth 24, with which mesh complementary teeth 25a, formed on an actuating pinion wheel 25. The actuating pinion wheels 25 are each arranged on a shaft 27 in such a way that they are unable to rotate but are capable of a certain amount of axial sliding movement against the force of compression springs 26, which engage to either side of each pinion 25. Shaft 27 is axially and radially mounted by way of roller bearings 28, 29 in arms which are attached to the supporting frame 7 or to the supporting part 8. The upper end of each shaft 27 is connected, by way of a resilient coupling 30, to the output shaft 31 of a hydraulic motor 32, which operates according to the displacement principle and is mounted on a bracket, which is fixed to the supporting part 8. Two ducts 34a, 35a serve to convey fluid pressure medium to and away from the motor 32, and communicate with two ring conduits 34 and 35. By means of a control valve (not shown) the two conduits 34, 35 can be blocked, or one conduit can be connected to a source of fluid pressure medium (for example a pump) while the other conduit is connected to a tank, and vice-versa. In this way all the motors 32 can be stopped or can be selectively driven in one or the other direction of rotation. In order to ensure identical pressure conditions at each motor, adjustable hydraulic pressurising valves, possibly in combination with non-return valves, may be provided at the motors.

A controllable valve 36, 37, in particular a solenoid valve, may be provided for each motor, at least in one of the two collecting pipes for the fluid pressure medium. These solenoid valves can be selectively actuated from an operating station, so that it is possible, according to the particular number of actuated valves at any given time, to start up only a certain number of the separate motors, while the other motors are stationary. This particular arrangement may be of advantage under certain circumstances. Conveniently, the valves may be actuatable in response to signals which are emitted by monitoring devices, contactless switches, probes (sensing elements) or the like, when specific positions or conditions of movement have been arrived at by the elements taking part in the working process involved, or when there is a departure from these positions or conditions of movement. Thus, completely automatic operation of the screw tightening process may be achieved. Electrical conductors for the valves 36, 37 are not shown in the drawing; they may, for example, be laid parallel to the hydraulic ducts.

In the embodiments of the invention illustrated the nuts 19, which serve as pressure transfer surfaces for the pistons 14, may be rotated by means of a motor or motors. A similar arrangement has already been described above for rotating the fixing nuts 5 through the use of such motors. For this purpose a hydraulic motor 39 is provided as rotary drive for each nut. This motor 39 may be identical to the motor 32, serving to rotate the fixing nut 5, and is held by a bracket 38, which is itself arranged on a supporting element 42, fixed to the cylinder 12. The output shafts 40 of the motors 39 are each fast in rotation with an actuating pinion wheel 44, whose teeth 44a mesh with complementary teeth 45 of a hollow, cylindrical actuating member 41. The actuating member 41 is rotatably mounted, with the interposition of roller bearings 43, in the supporting element 42, and comprises internal teeth 46, which mesh with external teeth 47 of the nut 19, which constitutes a pressure- or force-transferring element.

The motors 39 communicate with two ring conduits 48, 49 by way of feed- and discharge-ducts 48a, 49a for the fluid pressure medium. The ring conduits 48, 49 extend parallel to the ring conduits 34, 35 and, like the latter, can be blocked by means of a control valve (not shown), or selectively connected to a source of fluid pressure medium and to a tank, or vice-versa. Thus, the motors 39 can be brought to a stop, or can be selectively driven in one or the other direction of rotation. Similar arrangements may be adopted here as were explained above, in connection with the motors 32, in respect of the provision of adjustable pressurising valves and also the provisions of, and means of controlling, solenoid valves. Solenoid valves of this kind, provided for cooperation with the motors 39, are designated in the drawing by reference numerals 50a, 50b. Electrical leads for controlling the solenoid valves are not shown.

In order to securely hold the fixing nuts 5 in position on the apparatus, after they have been unscrewed or slackened from the screwbolts 1, holding devices 51 are provided on the supporting part 8 of the supporting frame 7. Each of these holding devices 51 comprises a pin 52, which is shiftable transversely of the axial direction of movement of the fixing nut 5, that is to say radially of the axis of each tensioning assembly 6. The pin 52 may for example be guided in a guide sleeve made of synthetic plastic material. The pin 52 is acted on by a compression spring 53, which tends to urge the pin 52 into its outer, rest position, illustrated in FIGS. 2 and 4. When the fixing nut 5 reaches, in the course of the unscrewing or slackening operation, a position in which its lower end lies at a higher level than the pin 52, then this pin 52 can be shifted into its inner, operative position (that is to say towards the right in FIGS. 2 and 4) by turning an eccentric 54, which lies against a head portion of the pin 52, against the force exerted by spring 53. When the pin 52 has been thus brought into its inner operative position, its front portion lies in alignment with the path of movement of the fixing nut 5 and below the latter, so that it prevents the nut 5 from falling out of the supporting part 8 at the supporting frame 7 even when the nut has been fully unscrewed or slackened from the screw bolt 1. In other words this pin 52 forms a supporting surface for the fixing nut 5 in these circumstances.

Figure 1:
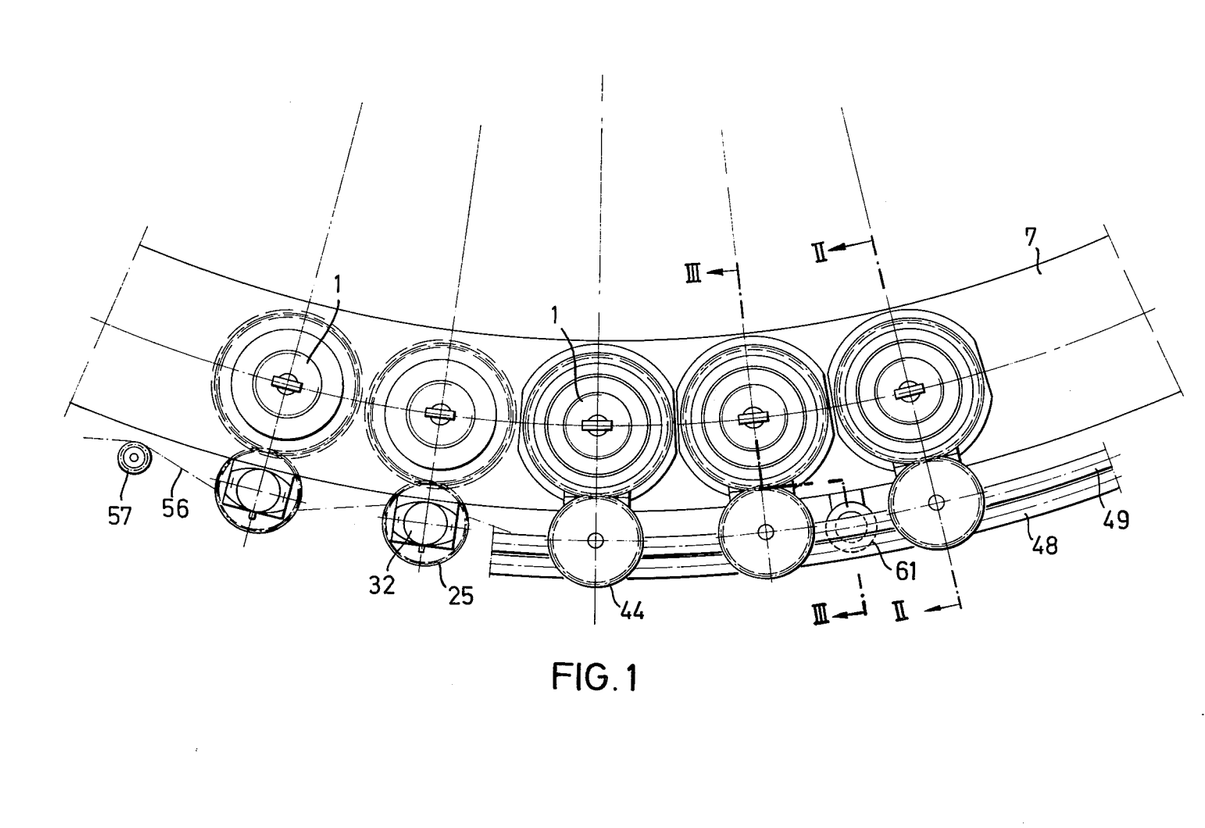
FIG. 1 is a plan view of part of an apparatus according to the invention, this apparatus being of ring-shaped formation as viewed in plan.

Each eccentric 54 is fast in rotation with the lower end of the shaft 27, which carries the actuating pinion wheel 25, although it is immovable axially with respect to the shaft 27. The eccentric 54 at the same time constitutes a sprocket wheel 55. A chain 56 (FIG. 1) is guided round all the eccentrics of the apparatus, or possibly round groups of such eccentrics, and is also placed round an actuating sprocket wheel 57, which can be turned, through 180°, by hand or, conveniently, by means of a single driving servo device, which is not shown. In this way the eccentrics 54 can be turned through this angle, as is required for bringing the holding pins 52 into their operative or inoperative positions.

The supporting frame 8 of the apparatus comprises a supporting device, by means of which the supporting frame 8 can be raised and lowered relative to a supporting surface, for example the upper face of the cover flange 2, or supporting members 60 (FIG. 3), which are positioned on this cover flange 2. In the case of the embodiment illustrated the supporting device contains a number (for example four) of cylinders 61, which are capable of actuation by fluid pressure medium and which are regularly distributed over the circumference and are fixed to the supporting part 8, one of these cylinders 61 only being shown in each of FIGS. 1 and 3. A piston 62 is slidable in each cylinder 61, the lower piston rod 63 of the piston shown in FIG. 3 constituting a leg of the supporting device. The piston rod 64 present on the other side of the piston 62 is used for guidance purposes.

The piston/cylinder assembly 61, 62 is double-acting. According to instantaneous requirements fluid pressure medium can be introduced - from a source of this fluid pressure medium (not shown), whence the fluid pressure medium flows through ducts and control valves which are also not shown - to the ducts 65 and 66, so that it is possible to raise or lower the supporting frame 8, together with the tensioning assemblies 6, relative to the cover flange 2.

In the embodiment illustrated in FIGS. 2 and 3 each screw bolt 1 has a stem part 1a, extending upwardly beyond screwthread 4 for the fixing screw 5, at whose end lies the screwthread 20, by means of which the nut 19 can be screwed into position, this nut 19 serving as a pressure- or force-transferring element. FIG. 4 illustrates another embodiment in which the screw bolts 1' end above the fixing screw-thread 4, and an extension portion 71, which can be releasably connected to the screw bolt 1', is provided for engagement of the tensioning apparatus. By means of this particular embodiment there is realised a shorter assembly when the tensioning apparatus has been removed.

The extension piece 71 may comprise a shoulder or an overlying head, which is equipped with external teeth, serving as an abutment surface for the piston 14. As is shown in FIG. 4, a nut 19' may be screwed down on to a screwthread 20' at the end of the extension piece 71, and can be prevented from turning, relative to the extension piece 71, by a suitable element of known kind. This nut 19' can be similar to that illustrated in the embodiment shown in FIGS. 2 and 3, and is provided with a set of external teeth 47 for engagement of the teeth of the actuating member 41. If the extension piece 71 is equipped with a conventional head or flange for the formation of an abutment surface, then the external teeth will be present on this head or flange.

For screwing this extension piece 71 to the screw bolt 1' there is, in particular, envisaged the use - in this kind of tensioning apparatus or in some other form of construction of tensioning apparatus - a conical screwthreaded connection 73 (FIG. 4). This is an advantageous feature of general importance, irrespective of other aspects of construction of the apparatus. A connection of this kind, entailing the use of a conical screwthread, is self-centering, can be established very rapidly, results in a constant position of the force-transferring surface, against which abuts the piston serving to apply tensioning pressure; and also this particular form of connection (with conical screwthread) is distinguished by a high degree of strength. In particular, the screwthreaded connection 73 may be of a form of construction which resembles that used in drilling rods in deep drilling technology, somewhat in the manner of so-called API screwthreaded connections. It may possibly be of advantage to provide a differing pitch of the screwthread on one of the two parts which are to be screwed together, as a result of which a uniform distribution of force may be obtained for all turns of the screwthread over the whole length of this screwthread.

According to a further, advantageous feature, which is of general importance, each of the tensioning bolts 1, 1' has - in front of or before the cylindrical screwthread 4, by means of which the fixing nut 5 can be screwed into position - a portion provided with a conical screwthread 4a, which merges into the portion with the cylindrical screwthread 4; and/or the screw bolts 1, or extension pieces 71 (which can be screwed down on to the screw bolts 1') each have - in front of a cylindrical screwthread 20, 20', by means of which a nut 19, 19' can be screwed into position, this nut 19, 19' serving as a force-transferring element - a portion 20a, 20a', which is equipped with a conical screwthread and merges into the portion with the cylindrical screwthread 20, 20'. This ensures that, when the nuts concerned are placed in position, their screw-threads will rapidly and reliably engage the complementary screwthreads on the cooperating screw bolt, and that the nuts will be satisfactorily guided at the start of the process whereby they are screwed into position on the screw bolt.

A description will now follow of the way in which the apparatus functions in the course of a tensioning operation. What is stated in respect of the embodiment of FIGS. 2 and 3 - in which a nut 19, serving as force-transmitting element, is screwed down onto the extended screw bolt 1 itself - is also true of the embodiment shown in FIG. 4, in which there is shown an extension piece 71, which is screwed into the screw bolt 1' proper.

In the starting condition, prior to the tensioning of the screw bolts 1, the lid is set down on the pressure vessel or the like, which is not shown, the screw bolts 1 passing through the bores 3 in the cover flange 2 and extending upwardly beyond the latter. The fixing nuts 5, and also the nuts 19 which serve as pressure- or force-transmitting elements, are located in the tensioning apparatus, which is in a state of readiness, the nuts 5 being held in the chambers or hollow spaces of the supporting part 8 by the pins 52 of the holding device 51, which have been advanced into their inner, operative position.

The apparatus is now set down, for example by means of a crane, on to the cover, in such a manner that the screw bolts 1 enter the central, hollow spaces of the tensioning assemblies 6. The piston rods 63, which serve as legs of the supporting assembly, are in their downwardly extended position and - when the apparatus is set down, as described above, on the cover of the pressure vessel or the like - the piston rods 63 come into abutting contact with the supporting blocks 60 (FIG. 3). Centring organs may possibly also be provided for enabling the apparatus to be set down accurately in a more simple manner.

The eccentrics 54 are now so turned, by means of the chain drive 55, 56, 57, that the holding pins 52 assume, subject to the force of the springs 53, their outer, inoperative position, in which they allow free access to the nuts 5. Motors 32 and 39 are then switched on, in consequence of which, and by way of the actuating pinion wheels 25 and actuating members 41 rotated by the motors 32 and 39, the fixing nuts and the force-transmitting nuts 19 are screwed down on to the respective screwthreads of the screw bolts 1. The provision of the conical screwthreaded portions 4a and 20a on the screw bolt 1 ensures that the screwthreads of the nuts and of the screw bolt will come into immediate and efficient engagement. At the same time the apparatus is lowered until approximately the position of the parts illustrated in the FIGS. is attained, this lowering action taking place through the discharge of fluid pressure medium from the spaces of the cylinders 61 lying above pistons 62, or by the admission of fluid pressure medium to the lower chambers of the cylinders 61 of the supporting apparatus. The speed at which this lowering action takes place may be controlled in step with the screwing down of the nuts on to the screw bolts. When motors 32 and 39 have been switched off, fluid pressure medium is admitted to the cylinders 11 and 12 through the ducts 17, 15, so that it can act on the pistons 13 and 14. Consequently, these pistonns 13, 14 are upwardly moved in step with each other, the upper face of the piston 14 being caused to bear against the nut 19, or against a ring 19a, present on this nut 19. In this way all the screw bolts 1 are stretched and tensioned subject to an identical force. The extent to which the screw bolts are stretched at any given time may be read off on dial gauges (extensometers) 76, which are attached to the ends of the screw bolts 1, or to extension pieces 71, attached to the bolts 1, sensing pins 74 associated with the dial gauges 76 lying in abutting contact with the end surfaces of measuring pins 75 (FIG. 4). Each measuring pin 75, or an extension thereof, passes through a bore into the inside of the screw bolt 1, and does not therefore participate in the stretching action carried out, so that this end surface of the measuring pins 75 consititute a reference surface.

When the required degree of tensioning has taken place, the motors 32 are switched on, so as to rotate the fixing nuts 5, which have been raised to a small extent from the cover flange 2 through the stretching of the screw bolts 1; in this way the nuts 5 are once again laid flat against the cover flange. The attainment of a desired condition may be displayed (indicaated) by a suitable monitoring device; thus a suitable signal may be simultaneously used for switching off the motors and for controlling the further sequence of operations.

FIGS. 2 and 4 illustrate an embodiment of a monitoring device for monitoring the condition of movement of the fixing nuts 5. A disc 81 is mounted on, and fast in movement with, the shaft 27, this disc 81 having marks, in the form of bores 82, uniformly distributed round its periphery. A light barrier, incorporating transmitter 83 and receiver 84, is positioned on the supporting part 8, the beam 85 emitted by the transmitter 83 of the light barrier being directed towards the bores 82 in the disc 81. When the shaft 27 rotates together with the disc 81, the beam 85 of the light barrier is alternately interrupted or allowed free passage, so that an alternating signal is generated. On the other hand, the condition of the light barrier is constant when the disc 81 is stationary. These two differing conditions can be indicated (displayed) with the use of known means at an operating station. For example, a display panel may be provided, which contains a check lamp for each tensioning assembly; the condition of the individual light barriers determines whether the individual lamps are illuminated or extinguished. The position of the fixing nuts 5 and of the force-transmitting nuts 19 can also be monitored by further devices, possibly in the form of light barriers, probes, (sensing devices), pneumatic sensing members, or the like. Signals emitted by these monitoring devices may also be used for control purposes. As is illustrated in FIGS. 2 to 4, it is also possible to provide - so as to enable the position of the upper nut 19 to be immediately ascertained - for example an upwardly directed pin 59 on each of the nuts 19, 19', this pin 59 being of a length such that, when the nut has been correctly screwed down, it will be positioned just within the hollow, cylindrical actuating member 41.

Further, it is possible to provide a monitoring device for monitoring the condition of movement of the nuts 19, which serve as abutment (force-transmitting) elements. This monitoring device may for example consist of a commercially available probe or sensing device 90, which is arranged on the bracket 38, functions in contact-free manner, and senses the underface of the actuating pinion wheel 44. This actuating pinion wheel 44 is provided with marks or with bores 44b, which act as marks. Accordingly, while the pinion wheel 44 is rotating, an alternating signal is generated, whereas a constant signal is generated when the actuating pinion wheel is stationary. This instantaneously existing condition may also be displayed, and also used for control purposes, as has been explained above in connection with the monitoring device 81 to 85.

When the screw bolts have been tensioned and all fixing nuts 5 brought, in the desired manner, into abutment with the cover flange 2, pistons 13, 14 are relieved of hydraulic pressure. The fixing nuts 5, which now receive the applied force, clamp the cover flange 2 to the cooperating flange of the pressure vessel or the like.

For removing the apparatus, fluid pressure medium is admitted to the cylinders of the reversing (return motion) pistons 21, in consequence of which the pistons 13, 14 are returned to their starting position. Motors 39 are then switched on and driven in the opposite direction of rotation than that previously obtaining and, further, fluid pressure medium is admitted to the spaces of the cylinders 61 of the supporting device which lie above the pistons 62. As a result of the rotation of the actuating members 41, which is brought about in this way, the nuts 19 are unscrewed, and finally released from the screw bolt ends. The completely released condition of the nuts 19 may, for example, be apparent from the fact that a suitable mark on the indicating pin 59 becomes visible, or owing to the fact that the upper edge of the nut itself becomes visible above the upper edge of the actuating member 41.

The attainment of this condition may, as mentioned above, also be indicated by a suitable sensing device or the like, which generates a signal, which may also be used to control the sequence of working steps to be carried out. When the nuts 19 have been released, the apparatus as a whole can be raised from the cover by means of a crane.

If an already-existing connection is to be released or disengaged, then the apparatus is set down in the manner which has been described above, and the individual working steps are carried out in the manner described above with the exception of those entailing the screwing-down of the fixing nuts. Through admission of fluid pressure medium to the cylinders 11 and 12, the screw bolts 1 are tensioned and stretched, so that, by switching on the motors 32 for the actuating pinion wheels 25, the fixing nuts 5 can be turned a sufficient amount in the direction required for unscrewing or slackening these nuts 5 from the screw bolts 1. Thereupon the pistons 13, 14 are relieved of pressure, and are returned into their starting positions by the reversing (return motion) pistons (21). The upper nuts 19 are then unscrewed from the screw bolts 1 with the means described above and, subject to simultaneous raising of the apparatus by means of the piston cylinder assemblies 61, 62, the fixing nuts 5 are released from the screw bolts 1, these nuts 5 coming into engagement with the stepped portions 10a of the rings 10. Each stepped part 10a guides its associated nut and, after the apparatus as a whole has been removed, holds this nut in the correct position for being screwed down again (retightened). This is possible by virtue of the fact that the ring 10 is again guided - by its upper portion 10b, having the larger diameter - in the bore 9 of the supporting part 8.

When, in the course of being released, the fixing nut has reached a position such that its lower end, or the ring 5a connected to it, lies above the associated pin 52 of the holding device 51, the chain drive 56, 57 is actuated, so as to turn the accentrics 54 through 180°, and thus bring the pins 52 into their inwardly advanced, operative position, in which they hold, and prevent from falling out, the fixing nuts 5, which have been unscrewed and released from the screw bolts 1 and received in the hollow spaces or chambers of the supporting part 8. In the case of the form of construction illustrated the fact that the fixing nut has reached this position can be determined (established) by a switch or probe, or by elements 70, which function in contact free (e.g., inductive) manner, these detection means being accommodated in the supporting part 8. A suitable display or indication of the position reached can also be given. The apparatus can then be conveyed, by means of a crane, to one side, whereupon the cover of the vessel concerned can be raised.

The invention provides an apparatus in which individual processes or all processes can be carried out in semiautomatic manner, or even completely automatically; monitoring and/or a desired sequence of working steps can be carried out with the devices mentioned or with other devices available to those versed in the art. For example, the sequence control principle may be utilised for this purpose.

All these features, which have been mentioned in the above description or which are illustrated in the drawing, may be regarded - insofar as the prior art permits this - as lying within the ambit of the present invention, these features being considered individually or in combination.

We claim:

1. Apparatus for simultaneously tensioning a number of screw bolts, necked-down bolts, tie bars or other elements, provided with fixing nuts, the apparatus including a supporting frame for tensioning assemblies, which can be set down on the screw bolts, and each of which has at least one cylinder with a piston slidable within the latter, which piston acts on a force-transmitting element, particularly in the form of a nut, which can be screwed down on to the screw bolt which is to be tensioned, and the apparatus being further provided with means located on the support frame and serving to turn the fixing nuts on the screw bolts, wherein the apparatus comprises motor-driven parts for rotating the force-transmitting elements, so as to screw or unscrew the latter on to or from the screw bolts, and holding devices for the fixing nuts on the supporting frame including means for retaining the nuts on the frame after they have been released from the screw bolts.

2. Apparatus according to claim 1, wherein a rotatable actuating member is provided for each force-transmitting element which can be screwed on to a screw bolt, this actuating member having teeth which engage in teeth of the force-transmitting elements.

3. Apparatus according to claim 2, wherein each actuating member can be driven by means of a motor, which is associated with the actuating member, is disposed on the supporting frame, and whose direction of rotation is reversible.

4. Apparatus according to claim 1, wherein there is provided, as motor drives for rotating the pressure-transmitting element, motors which are driven by fluid pressure medium and which, in particular, function according to the displacement principle.

5. Apparatus according to claim 3, wherein at least one switching- or control element is associated with each motor, and serves to effect the working condition of the motor.

6. Apparatus according to claim 1, wherein there is provided, as actuating members for rotating the force-transmitting elements, hollow, cylindrical members, which are provided with inner teeth, and are mounted on the supporting frame or on a part which is attached to the supporting frame.

7. Apparatus according to claim 1, wherein each fixing nut is provided with a motor, which is arranged on the supporting frame, is reversible in respect of its direction of rotation, and serves as a rotary drive for tightening and untightening the fixing nuts.

8. Apparatus according to claim 7, wherein the motors for the fixing nuts are operable with a fluid pressure medium and, in particular, are motors which function according to the displacement principle.

9. Apparatus according to claim 7, wherein there is associated with each fixing nut motor at least one switching-or control-element for affecting the operating condition of the fixing nut motor concerned.

10. Apparatus according to claim 1, wherein an actuating pinion wheel is associated with each fixing nut, is rotatable by means of a fixing nut motor, and has teeth which mesh with external teeth of the fixing nut.

11. Apparatus according to claim 10, wherein each actuating pinion wheel is arranged on a shaft which is mounted for rotation in the supporting frame.

12. Apparatus according to claim 10, wherein the actuating pinion wheels are axially supported, on their shafts, by resilient elements, in particular compression springs.

13. Apparatus according to claim 1, wherein a stepped ring is arranged on each screw bolt, is axially shiftable relative to the screw bolt, and a portion of this ring lying closer to the fixing nut has a smaller diameter than the screw-thread of the fixing nut.

14. Apparatus according to claim 1, wherein a monitoring device is provided for monitoring the condition of movement of the fixing nuts and/or of the pressure- or force-transmitting elements.

15. Apparatus according to claim 14, wherein that the operating condition of the fixing nut motors and/or of the motors for the actuating members can be controlled in response to a signal of the monitoring device.

16. Apparatus according to claim 14, wherein a sensing device is provided for sensing marks or the like on a part, which is rotatable synchronously with the fixing nut or with the force-transmitting element.

17. Apparatus according to claim 16, wherein an indicating (display) device is provided for the signals which have been generated by the sensing devices and which may possibly have been processed or further processed.

18. Apparatus according claim 1, wherein the supporting frame comprises a supporting device, by means of which the frame can be raised and lowered relative to a supporting surface.

19. Apparatus according to claim 18, wherein the supporting apparatus contains at least three double-acting piston/cylinder assemblies.

20. Apparatus according to claim 19, wherein piston rods of the piston/cylinder assembly constitute legs of the supporting apparatus.

21. Apparatus according to claim 1, wherein each holding device comrpises a holding member which is shiftable from an outer, inoperative position into an inner, operative position in which the holding member is in alignment beneath the path of movement of the fixing nut when released from the screw bolts.

22. Apparatus according to claim 21, wherein the holding member includes means spring-loading the member toward the inoperative position, and a rotatable eccentric operatively connected to the holding member for overcoming the spring loading for disposing the holding member in a position to support a nut.

23. Apparatus according to claim 22, including common driving means operatively connected to said eccentrics for simultaneously operating the respective holding members.

24. Apparatus according to claim 23, wherein the eccentrics are mounted for rotation on shafts, said shafts having journaled thereon actuating pinion wheels for engaging the fixing nuts.

25. Apparatus according to claim 1, wherein the screw bolts each have a cylindrical screwthread, for accommodating which serve to tighten the fixing nut, a portion including a conical screwthread, which merges into the cylindrical threwthread.

26. Apparatus according to claim 1, including extension pieces which are attached to the bolts by a screwthreaded connection, each extension piece having a cylindrical screwthread accommodating a nut which comprises the force-transmitting element and including a region having a conical screwthread, which merges into the cylindrical screwthread.

27. Apparatus according to claim 1, including an extension piece having a conical screwthread for axial connection to the screw bolts.

* * * * *